United States Patent
Pitcole

(10) Patent No.: US 10,322,656 B2
(45) Date of Patent: Jun. 18, 2019

(54) FOLDING FURNITURE PIECE SYSTEM AND METHOD

(71) Applicant: GM GLOBAL TECHNOLOGY OPERATIONS LLC, Detroit, MI (US)

(72) Inventor: Ross Pitcole, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 185 days.

(21) Appl. No.: 15/663,185

(22) Filed: Jul. 28, 2017

(65) Prior Publication Data

US 2019/0031069 A1  Jan. 31, 2019

(51) Int. Cl.
*B60N 3/00* (2006.01)

(52) U.S. Cl.
CPC .................... *B60N 3/004* (2013.01)

(58) Field of Classification Search
CPC ........ B60N 3/004; B60N 3/001; B60N 3/002; A47C 9/06; A47C 1/121; A47C 4/08; A47C 7/445; A47B 5/04; A47B 3/08; A47B 96/202
USPC ......... 297/163, 169, 354.11, 354.12, 452.15, 297/452.14, 452.13, 452.12, 452.11
See application file for complete search history.

(56) References Cited

U.S. PATENT DOCUMENTS

| | | | | |
|---|---|---|---|---|
| 3,233,885 A * | 2/1966 | Propst | ................... | A47B 96/202 267/153 |
| 3,877,750 A * | 4/1975 | Scholpp | ................. | A47C 1/143 297/284.3 |
| 4,157,203 A * | 6/1979 | Ambasz | ................. | A47C 7/441 297/285 |
| 4,981,326 A * | 1/1991 | Heidmann | ............. | A47C 3/026 297/285 |
| 7,458,637 B2 * | 12/2008 | Norman | .................... | A47C 7/46 297/284.4 |
| 8,590,978 B2 * | 11/2013 | Jaranson | ................ | B60N 2/643 297/218.1 |
| 9,084,476 B2 | 7/2015 | Mojtabavi et al. | | |
| 9,480,340 B1 * | 11/2016 | Harlow | ................... | A47C 7/543 |
| 2011/0177279 A1 * | 7/2011 | Casteras | ................ | B64G 1/222 428/53 |
| 2013/0214577 A1 * | 8/2013 | Mojtabavi | ................ | A47B 3/08 297/331 |
| 2016/0022044 A1 * | 1/2016 | Leonard | ................... | A47C 1/02 297/285 |

* cited by examiner

*Primary Examiner* — Mark R Wendell

(57) ABSTRACT

A folding furniture piece including: a spring mechanism including a flange; an articulated vertebral column including multiple vertebral members arranged and operatively connected via one or more connecting members to form a flexible unit including the vertebral column and an object base; a locking mechanism located on the object base; the spring mechanism exhibiting properties such that the folding furniture piece assumes an unfolded state where both the vertebral column and spring mechanism are substantially straight to provide a closed sitting surface and, in response to a bending force, assumes a folded state where both the vertebral column and spring mechanism are curved to expose the sitting surface on which an object can rest, and where, in response to the bending force, the spring mechanism travels along the object base such that the locking mechanism operatively interlocks with the flange and the folding furniture piece remains in the folded state.

20 Claims, 8 Drawing Sheets

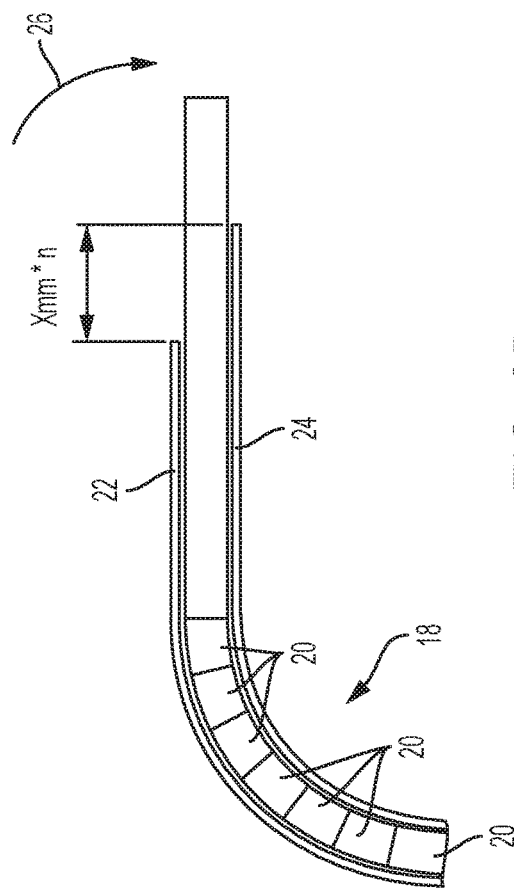
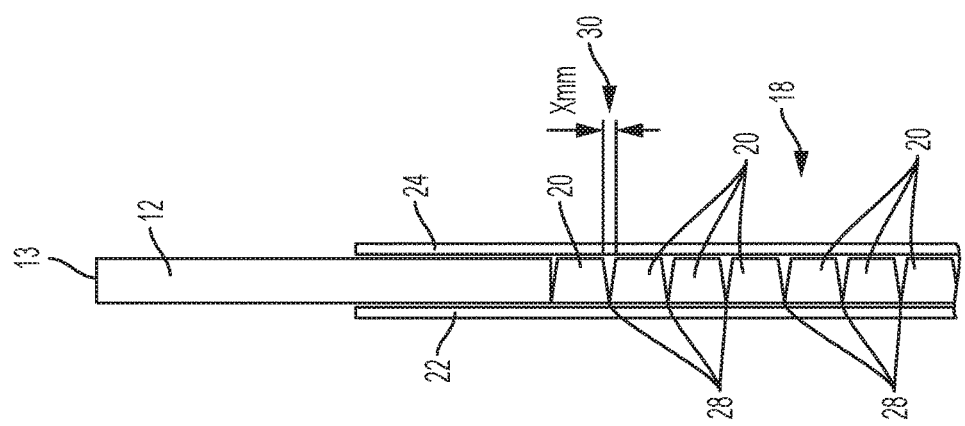

FOLDING FURNITURE PIECE SYSTEM AND METHOD

INTRODUCTION

Vehicle passengers often want the opportunity to work or eat during a trip. However, organizing and holding their work items or food can be an issue. In many instances, these items and food will end up getting littered across the vehicle's interior, for instance, the passenger seat or backseat. It is therefore desirable to provide a platform in which passengers can place their items and/or food, to better organize space and keep items from sprawling out across the vehicle interior as well as a surface to work on while in the vehicle.

SUMMARY

A folding furniture piece configured for convenient storage is presented herein. The folding furniture piece including: a spring mechanism including a flange. The folding furniture piece also includes an articulated vertebral column including multiple vertebral members arranged in lengthwise parallel alignment with one another and operatively connected to one another via one or more connecting members. The folding furniture piece also includes the one or more connecting members configured to cooperate with the operatively connected vertebral members to form a flexible unit including the vertebral column and an object base. The folding furniture piece also includes the object base having opposite ends between which is located a sitting surface on one side and an external surface on the opposite side, one end of the object base connected to the vertebral column and the other end of the object base constituting a free end. The folding furniture piece also includes a locking mechanism located on the external surface of the object base. The folding furniture piece also includes the spring mechanism exhibiting flexibility properties such that the folding furniture piece assumes an unfolded state in which both the vertebral column and spring mechanism are substantially straight to provide a closed sitting surface and, in response to an externally applied bending force, assumes a folded state in which both the vertebral column and spring mechanism are curved to expose the sitting surface on which an object can rest, and where, in response to the externally applied bending force, at least a portion of the spring mechanism travels along the external surface of the object base such that the locking mechanism operatively interlocks with the flange and causes the folding furniture piece to remain releasably locked in the folded state.

Implementations may include one or more of the following features. The folding furniture piece may be mounted onto the backrest of a vehicle seat. The multiple vertebral members of the articulated vertebral column may be interconnected via living hinges and each vertebral member may include chamfered sides, and where, in response to the externally applied bending force, the living hinges bend such that the chamfered sides of the multiple vertebral members press against each other or one end of the object base such that the vertebral column will bend and cause the folding furniture piece to assume the folded state. The chamfered sides may be at a five degree angle.

The folding furniture piece where: the locking mechanism is mounted to the external surface of the object base via a spring hinge. The folding furniture piece may also include the locking mechanism further includes a stop. The folding furniture piece may also include where the stop is configured to pass over the flange while at least a portion of the spring mechanism travels along the external surface of the object base, the stop is further configured to return to rest against the spring mechanism after passing over the flange so as to allow the locking mechanism to operatively interlock with the flange when the stop presses against one side of the flange. The folding furniture piece where the locking mechanism further includes a handle configured to enable a user to move the stop away from resting against the surface of the spring mechanism via the spring hinge. Both the one or more connecting members and spring mechanism may be flexible steel strips.

One general aspect includes a folding furniture piece configured for convenient storage, the folding furniture piece including: a spring mechanism including a plurality of spaced slots. The folding furniture piece also includes an articulated vertebral column including multiple vertebral members arranged in lengthwise parallel alignment with one another and operatively connected to one another via one or more connecting members. The folding furniture piece also includes the one or more connecting members configured to cooperate with the operatively connected vertebral members to form a flexible unit including the vertebral column and an object base. The folding furniture piece also includes the object base having opposite ends between which is located a sitting surface on one side and an external surface on the opposite side, one end of the object base connected to the vertebral column and the other end of the object base constituting a free end. The folding furniture piece also includes a locking mechanism located on the external surface of the object base. The folding furniture piece also includes the spring mechanism exhibiting flexibility properties such that the folding furniture piece assumes an unfolded state in which both the vertebral column and spring mechanism are substantially straight to provide a closed sitting surface and, in response to an externally applied bending force, assumes an adjustably folded state in which both the vertebral column and spring mechanism are curved to expose the sitting surface on which an object can rest, and where, in response to the externally applied bending force, at least a portion of the spring mechanism travels along the external surface of the object base such that the locking mechanism operatively interlocks with one of the slots in the plurality of slots and causes the folding furniture piece to remain releasably locked in the adjustably folded state.

Implementations may include one or more of the following features. The folding furniture piece may be mounted onto the back panel of a vehicle seat. The multiple vertebral members of the articulated vertebral column may be interconnected via living hinges and each vertebral member may include chamfered sides, and where, in response to the externally applied bending force, the living hinges bend such that the chamfered sides of the multiple vertebral members press against each other or one end of the object base such that the vertebral column will bend and cause the folding furniture piece to assume the folded state. The chamfered sides may be at a five degree angle.

The folding furniture piece where: the locking mechanism is mounted to the external surface of the object base via a spring hinge. The folding furniture piece may also include the locking mechanism further includes a stop. The folding furniture piece may also include each slot in the plurality of slots includes a tapered side and a flat side. The folding furniture piece may also include where the stop is configured to pass over each slot via the tapered side until the stop can return to rest in a selected slot of the plurality slots while at least a portion of the spring mechanism travels along the external surface of the object base, the stop is further configured to return to rest in the selected slot so as to allow the locking mechanism to operatively interlock with the selected slot when the stop presses against the flat side of the selected slot. The folding furniture piece where the locking mechanism further includes a handle configured to enable a user to move the stop away from resting against the surface of the spring mechanism or within a selected slot via the spring hinge. The folding furniture piece where both the one or more connecting members and spring mechanism are flexible steel strips.

One general aspect includes a method of installing a folding furniture piece onto a surface, the method including: providing a folding furniture piece configured for convenient storage. The folding furniture piece including: a spring mechanism including a flange; an articulated vertebral column including multiple vertebral members arranged in lengthwise parallel alignment with one another and operatively connected to one another via one or more connecting members; the one or more connecting members configured to cooperate with the operatively connected vertebral members to form a flexible unit including the vertebral column and an object base; the object base having opposite ends between which is located a sitting surface on one side and an external surface on the opposite side, one end of the object base connected to the vertebral column and the other end of the object base constituting a free end; a locking mechanism located on the external surface of the object base; the spring mechanism exhibiting flexibility properties such that the folding furniture piece assumes an unfolded state in which both the vertebral column and spring mechanism are substantially straight to provide a closed sitting surface and, in response to an externally applied bending force, assumes a folded state in which both the vertebral column and spring mechanism are curved to expose the sitting surface on which an object can rest, and where, in response to the externally applied bending force, at least a portion of the spring mechanism travels along the external surface of the object base such that the locking mechanism operatively interlocks with the flange and causes the folding furniture piece to remain releasably locked in the folded state. The method also includes fastening a section of the folding furniture piece located below the articulated vertebral column onto the surface. The method also includes allowing space for an external bending force to be applied to at least the spring mechanism. The method also includes allowing space for the folding furniture piece to assume a folded state in which both the vertebral column and spring mechanism are curved to expose the sitting surface on which an object can rest.

Implementations may include one or more of the following features. The method of installing a folding furniture piece where the surface is the back panel of a vehicle seat. The method of installing a folding furniture piece where the multiple vertebral members of the articulated vertebral column are interconnected via living hinges and each vertebral member includes chamfered sides, and where, in response to the externally applied bending force, the living hinges bend such that the chamfered sides of the multiple vertebral members press against each other or one end of the object base such that the vertebral column will bend and cause the folding furniture piece to assume the folded state. The method of installing a folding furniture piece where the chamfered sides are at a five degree angle. The method of installing a folding furniture piece where: the locking mechanism is mounted to the external surface of the object base via a spring hinge; the locking mechanism further includes a stop; where the stop is configured to pass over the flange while at least a portion of the spring mechanism travels along the external surface of the object base, the stop is further configured to return to rest against the spring mechanism after passing over the flange so as to allow the locking mechanism to operatively interlock with the flange when the stop presses against one side of the flange. The method of installing a folding furniture piece where the locking mechanism further includes a handle configured to enable a user to move the stop away from resting against the surface of the spring mechanism via the spring hinge.

The above features and advantages and other features and advantages of the present teachings are readily apparent from the following detailed description for carrying out the teachings when taken in connection with the accompanying drawings.

BRIEF DESCRIPTION OF THE DRAWINGS

FIG. 3A shows a side view of the folding furniture piece of FIG. 1 according to another aspect of the present disclosure;

FIG. 3B shows a side view of the folding furniture piece of FIG. 1 according to another aspect of the present disclosure;

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
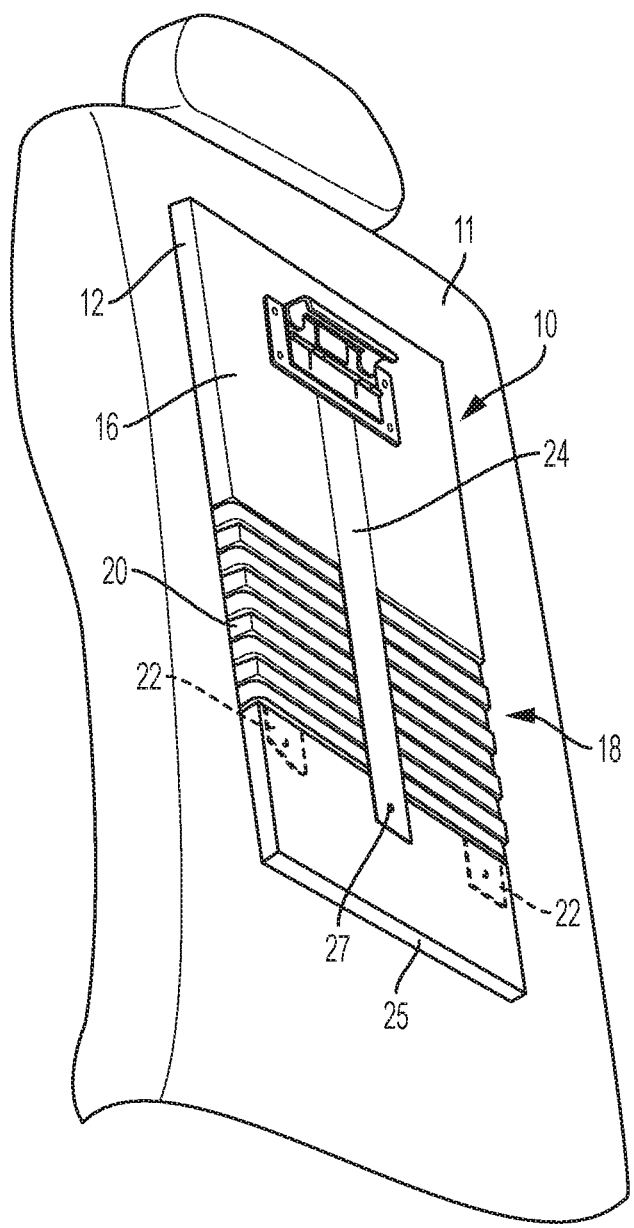
FIG. 1 shows a perspective view of a folding furniture piece according to one aspect of the present disclosure.
Figure 1A:
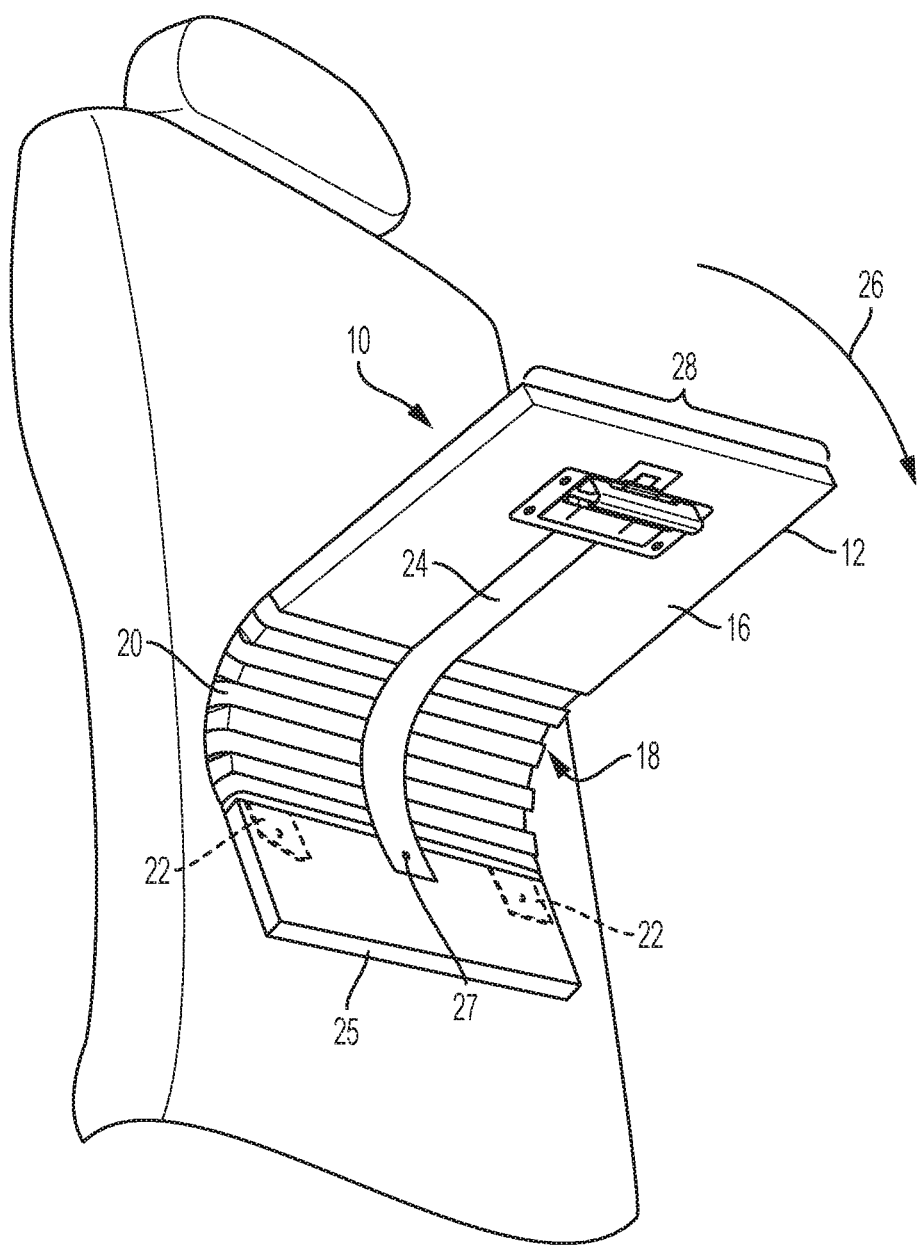
FIG. 1A shows a perspective view of the folding furniture piece of FIG. 1 according to another aspect of the present disclosure.

FIGS. 1 and 1A are isometric views of a compact folding furniture piece 10, shown in, respectively, an unfolded state that is convenient for storage (FIG. 1) and a stationary folded state (FIG. 1A) that is convenient for resting one or more objects such as, for example, laptop computers, personal computing devices, food, and drink containers. Furniture piece 10 may be installed onto the backside of a vehicle seat back panel 11 and may also be manufactured from materials such as, but not limited to, plastic, fiberglass, wood, glass, rubber, metal, or any combination thereof.

Furniture piece 10 has a generally rectangular shape with an object base 12 having a sitting surface 14, which is unexposed when furniture piece 10 is in a folded state and exposed when piece 10 is in an unfolded state. On the opposite side, object base 12 has an external surface 16, which is fully exposed when furniture piece 10 is in a folded state but faces toward the ground when piece 10 is in an unfolded state. As such, object base 12 is substantially horizontal when furniture piece 10 is unfolded and a user (not shown) has the opportunity to rest objects on the sitting surface with ease.

Figure 2:
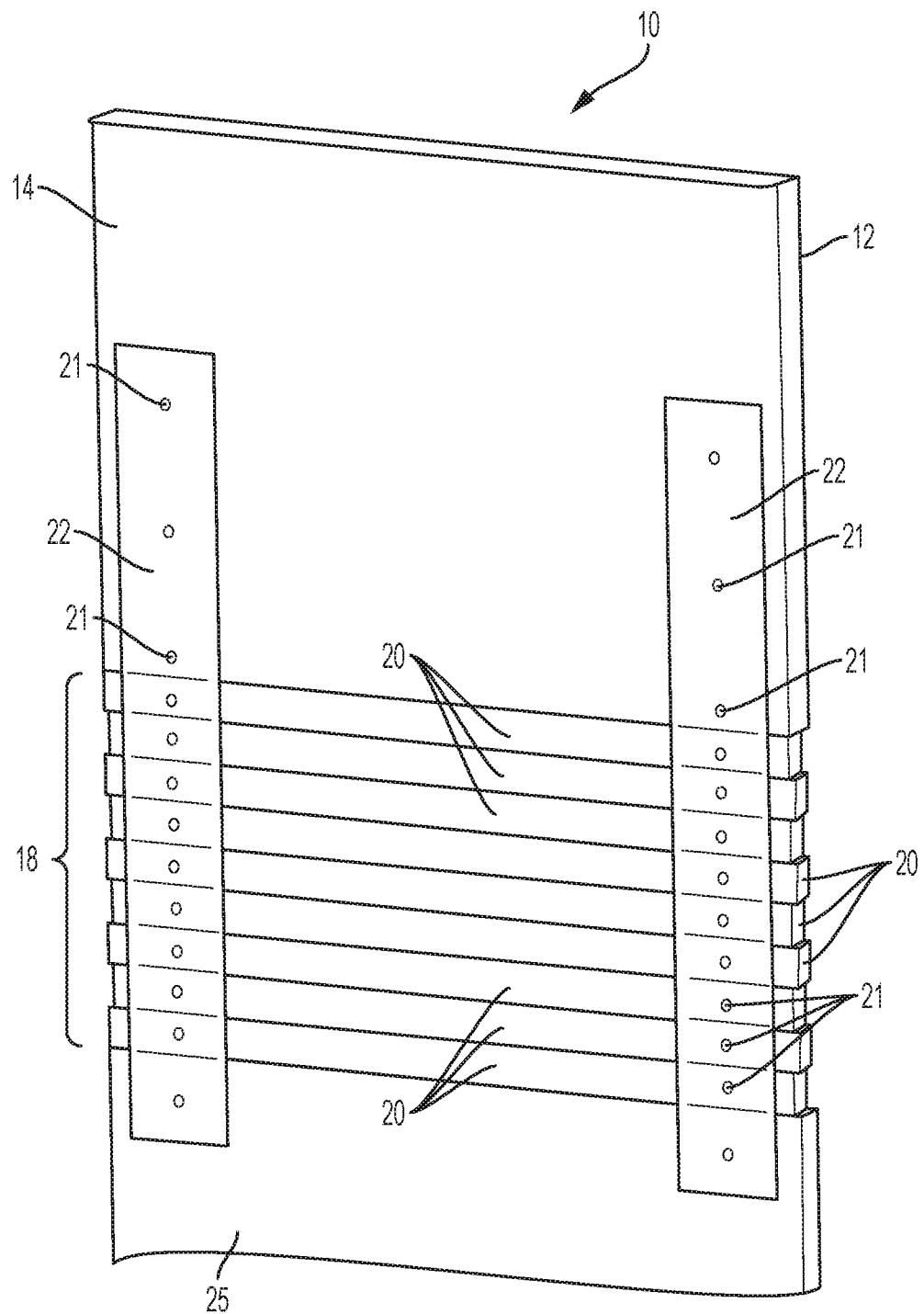
FIG. 2 shows a perspective view of the backside of folding furniture piece of FIG. 1 according to another aspect of the present disclosure.

One end of object base 12 abuts a vertebral column 18 having numerous vertebral members 20 being arranged in a lengthwise and parallel alignment. With reference to FIG. 2, two connecting members 22, which are flexible strips of spring steel, are mounted to one side of furniture piece 10. Moreover, these connecting members 22 are operatively connected to object base 12 and each vertebral member 18, and thus cooperates with these components, so as to form a flexible unit that can ultimately produce the folded and unfolded state of furniture piece 10. Connecting members 22 may be mounted to furniture piece 10 (i.e., the object base 12 and vertebral members 20) via joining mechanisms such as, but not limited to, screws and bolts 21. Spring steel may be understood as any composition of steel with a high-yield strength and does not deform under a load (i.e., allowing the steel to return to its original shape).

A spring mechanism 24, which may also be embodied as a strip of spring steel, is mounted to furniture piece 10 on the opposite side in which the connecting members 22 are mounted (i.e., the side including the external surface of object base 12). Similar to the connecting members 22, the spring mechanism 24 also exhibits flexible properties. As a result, spring mechanism 24 allows furniture piece 10 to assume its unfolded state in which both the vertebral column 18 and spring mechanism 24 are vertically erected in a substantially straight manner, which also closes the sitting surface off to users (see FIG. 1). Thus, when properly installed onto a vehicle seat, in this position, the sitting surface will be pressed against the back panel 11. However, when an external bending force 26 is applied to furniture piece 10 (e.g., through the gripping and downward pulling of the user), specifically the free side of object base 13, furniture piece 10 can assume the folded state in which both the vertebral column 18 and spring mechanism 24 are curved to expose the sitting surface on which objects can rest (see FIG. 1A). Spring mechanism 24 may be mounted to a mounting section of furniture piece 25 (i.e., the section 25 located on the opposite side of vertebral column 18 relative to object base 12) via joining mechanisms such as, but not limited to, screws and bolts 27.

As shown in FIGS. 3A and 3B, the multiple vertebral members 20 may have chamfered sides and can be interconnected with each other via living hinges 28. The vertebral member 20 at one end of vertebral column 18 may also be attached to object base 12 via a living hinge 28. Therefore, in response the bending force 26, discussed above, the living hinges 28 rotate/flex such that the sides of each vertebral member 20 will press against each other (or one end of object base 12) and cause the vertebral column 18 and spring mechanism 24 to bend to allow furniture piece 10 to assume its folded state. Moreover, when the bending force 26 is applied, one end of spring mechanism 24 will travel (e.g., slide) a calculated distance along the external surface of object base 12 in response to this bending action.

$$D = G_{mm} \times n$$

For instance, the above equation can be used to calculate the distance in which spring mechanism 24 will slide along object base 12. Where the variable "Gmm" represents the gap distance 30 (between unfolded vertebral members 20) dependent upon the angle of the chamfered sides of each vertebral member 20. Moreover, the variable "n" represents the number of vertebral members 20 (see FIG. 3B). For example, when the chamfer angle of the sides is five (5) degrees, a gap distance of 1.66 millimeters (mm) can occur between each vertebral member 20. Therefore, when the vertebral column 18 incorporates nine (9) vertebral members, the spring mechanism 24 will slide 14.94 millimeters (i.e., 1.66 mm*9=14.94 mm). It should be noted that, while in an unfolded state, the connecting members 22 and spring mechanism 24 are at the same corresponding location. Skilled artisans will also see that nine vertebral members 20 having chamfered sides at five degrees will produce an overall bend of 90 degrees.

Figure 4:
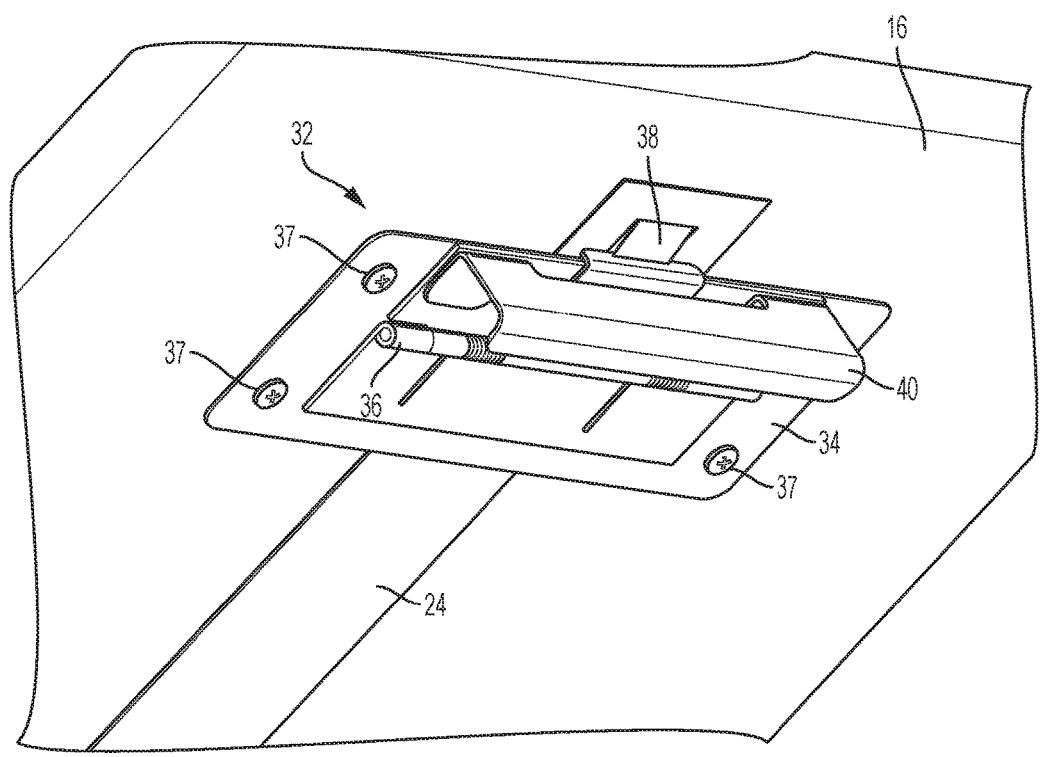
FIG. 4 shows a perspective view of the locking mechanism of the folding furniture piece of FIG. 1 according to another aspect of the present disclosure.
Figure 5A:
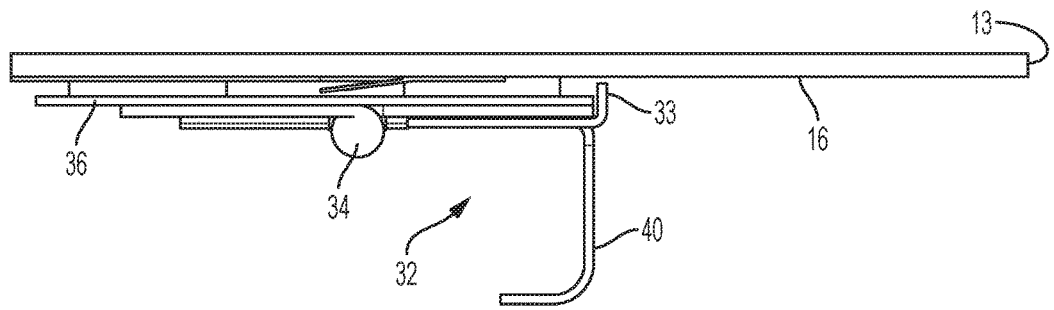
FIG. 5A shows a side view of the locking mechanism of FIG. 4 in a first position and according to another aspect of the present disclosure.
Figure 5B:
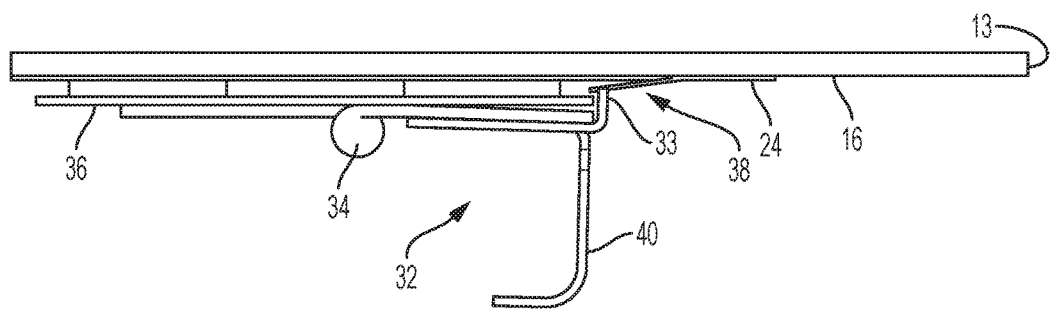
FIG. 5B shows a side view of the locking mechanism of FIG. 4 in a second position and according to another aspect of the present disclosure.
Figure 5C:
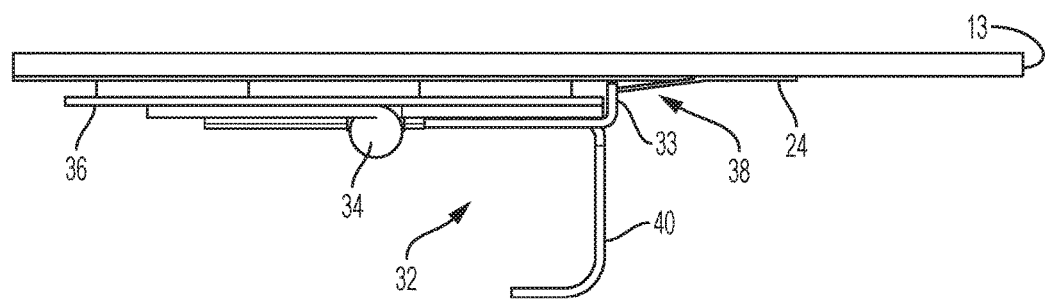
FIG. 5C shows a side view of the locking mechanism of FIG. 4 in a third position and according to another aspect of the present disclosure.

As shown in FIGS. 4 through 5C, an exemplary embodiment of a locking mechanism 32, having a stop 33, is mounted to the external side of object base 12 via a rotatable spring hinge 34 connected to a support mount 36. Additionally, a corresponding embodiment of spring mechanism 24 includes a ramp shaped flange 38. As such, when spring mechanism 24 slides across the external side of object base 12, discussed above, the stop 33 will pass over the slope of flange 38 ramp and subsequently rotate back so as return to rest against spring mechanism 24 (via spring force from hinge 34) such that any reverse slide movement of spring mechanism 24 will cause stop 33 to press against the flat, non-sloped side of flange 38 and operatively lock spring mechanism 24 in place (see generally FIGS. 5A through 5C in sequence). This interaction therefore ultimately causes the folding furniture piece 10 to remain releasably locked and stationary in the folded state. Support mount 36 may be mounted to object base 12 via joining mechanisms such as, but not limited to, screws and bolts 37.

Locking mechanism 32 also includes a handle 40 to assist in releasing the spring mechanism 24 from being locked into place. Intrinsically, handle 40 enables a user to move stop 33 away from being rested against the surface of spring mechanism 24 through the rotating movement of spring hinge 34.

Figure 6:
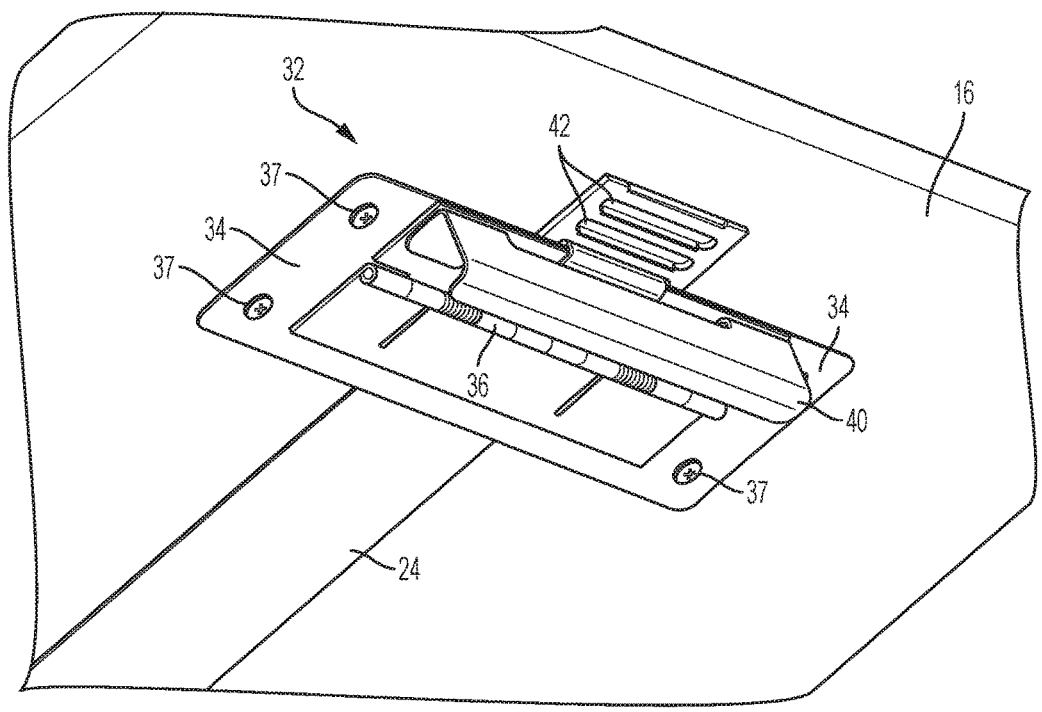
FIG. 6 shows a perspective view of the locking mechanism of the folding furniture piece of FIG. 1 according to another aspect of the present disclosure.
Figure 7A:
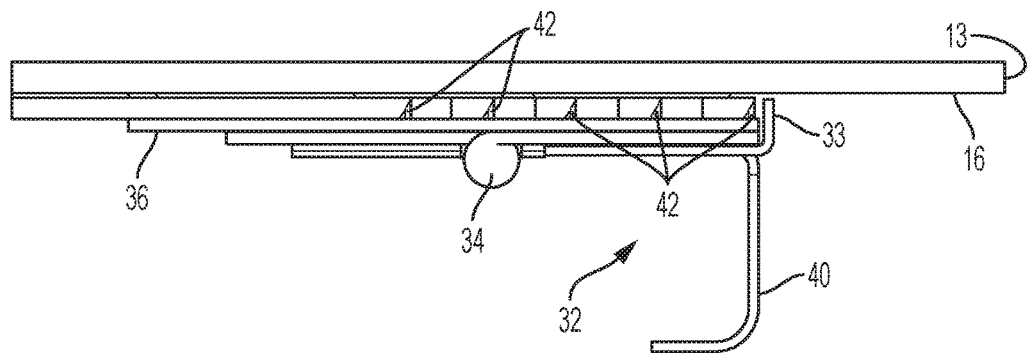
FIG. 7A shows a side view of the locking mechanism of FIG. 6 in a first position and according to another aspect of the present disclosure.
Figure 7B:
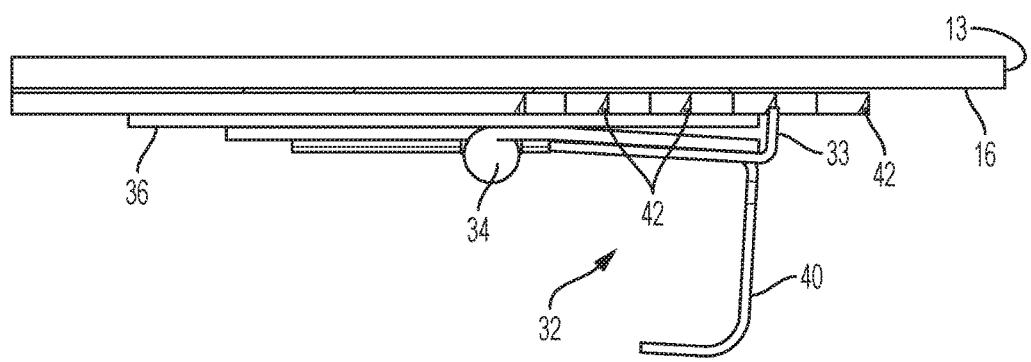
FIG. 7B shows a side view of the locking mechanism of FIG. 6 in a second position and according to another aspect of the present disclosure.
Figure 7C:
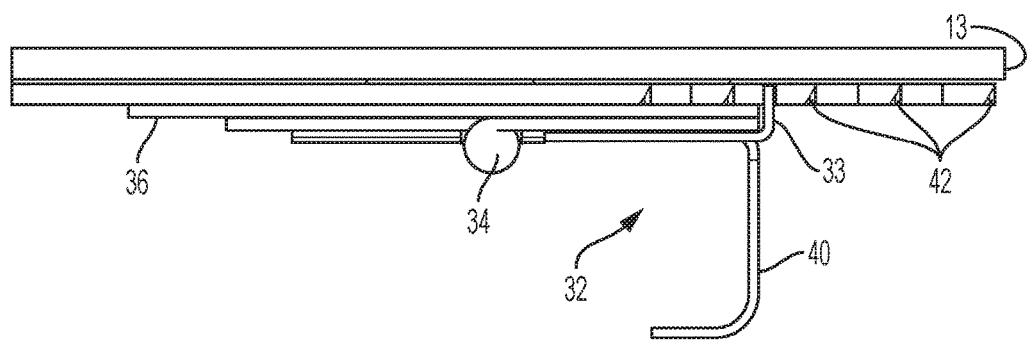
FIG. 7C shows a side view of the locking mechanism of FIG. 6 in a third position and according to another aspect of the present disclosure.

Another exemplary embodiment of a locking mechanism 32 is shown in FIGS. 6 through 7C. Similar to the previous example embodiment, this embodiment incorporates a stop 33 and is mounted to the external side of object base 12 by a spring hinge 34 connected to support mount 36. However, a corresponding spring mechanism 24 includes numerous evenly spaced elongated slots 42. Each slot 42 integrates a flat side and tapered side. As such, when spring mechanism 24 slides across the external side of object base 12, stop 33 will pass over each slot 42, by sliding up and out of the slot base via the tapered side, until stop 33 subsequently returns to rest in the base of a selected slot 42 (via spring force from hinge 34). As a result, any reverse slide movement of spring mechanism 24 will cause stop 33 to press against the flat, non-sloped, side of the selected slot 42 and operatively lock spring mechanism 24 in its place (see generally FIGS. 7A through 7C in sequence). This interaction therefore ultimately causes the folding furniture piece 10 to remain releasably locked in an adjusted, stationary folded state. For example, a user may select a slot 42 close to the object base free side 13 and cause an overall bend of vertebral column 18 to be 95 degrees. Alternatively, a user may select a slot 42 closer to vertebral column 18 and cause a bend of 90 degrees.

Installation of furniture piece 10 is a relatively short process that includes few steps. First, section 25 of furniture piece 10 is fastened onto vehicle seat back panel 11. This may be accomplished after an installation expert (not shown) centers and correctly positions furniture piece 10 onto back panel 11 such that a user may place objects onto the unfolded sitting surface with ease. Next, the installation expert should ensure there is adequate space behind the vehicle seat so that a bending force can be applied directly to the object base 12, and indirectly to the spring mechanism. Finally, the installation expert should ensure there is adequate space for the folding furniture piece to assume its folded state. As such, there should be enough space behind the vehicle seat when properly installed into a vehicle (e.g., 1½ to 2 feet).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A folding furniture piece configured for convenient storage, the folding furniture piece comprising:
    a spring mechanism comprising a flange;
    an articulated vertebral column comprising multiple vertebral members arranged in lengthwise parallel alignment with one another and operatively connected to one another via one or more connecting members;
    the one or more connecting members configured to cooperate with the operatively connected vertebral members to form a flexible unit comprising the vertebral column and an object base;
    the object base having opposite ends between which is located a sitting surface on one side and an external surface on the opposite side, one end of the object base connected to the vertebral column and the other end of the object base constituting a free end;
    a locking mechanism located on the external surface of the object base; and
    the spring mechanism exhibiting flexibility properties such that the folding furniture piece assumes an unfolded state in which both the vertebral column and spring mechanism are substantially straight to provide a closed sitting surface and, in response to an externally applied bending force, assumes a folded state in which both the vertebral column and spring mechanism are curved to expose the sitting surface on which an object can rest, and wherein, in response to the externally applied bending force, at least a portion of the spring mechanism travels along the external surface of the object base such that the locking mechanism operatively interlocks with the flange and causes the folding furniture piece to remain releasably locked in the folded state.

2. The folding furniture piece of claim 1, wherein the folding furniture piece is mounted onto the back panel of a vehicle seat.

3. The folding furniture piece of claim 1, wherein the multiple vertebral members of the articulated vertebral column are interconnected via living hinges and each vertebral member comprises chamfered sides, and wherein, in response to the externally applied bending force, the living hinges bend such that the chamfered sides of the multiple vertebral members press against each other or one end of the object base such that the vertebral column will bend and cause the folding furniture piece to assume the folded state.

4. The folding furniture piece of claim 3, wherein the chamfered sides are at a five degree angle.

5. The folding furniture piece of claim 1, wherein:
    the locking mechanism is mounted to the external surface of the object base via a spring hinge;
    the locking mechanism further comprises a stop; and
    wherein the stop is configured to pass over the flange while at least a portion of the spring mechanism travels along the external surface of the object base, the stop is further configured to return to rest against the spring mechanism after passing over the flange so as to allow the locking mechanism to operatively interlock with the flange when the stop presses against one side of the flange.

6. The folding furniture piece of claim 5, wherein the locking mechanism further comprises a handle configured to enable a user to move the stop away from resting against the surface of the spring mechanism via the spring hinge.

7. The folding furniture piece of claim 1, wherein both the one or more connecting members and spring mechanism are flexible steel strips.

8. A folding furniture piece configured for convenient storage, the folding furniture piece comprising:
    a spring mechanism comprising a plurality of spaced slots;
    an articulated vertebral column comprising multiple vertebral members arranged in lengthwise parallel alignment with one another and operatively connected to one another via one or more connecting members;

the one or more connecting members configured to cooperate with the operatively connected vertebral members to form a flexible unit comprising the vertebral column and an object base;

the object base having opposite ends between which is located a sitting surface on one side and an external surface on the opposite side, one end of the object base connected to the vertebral column and the other end of the object base constituting a free end;

a locking mechanism located on the external surface of the object base; and the spring mechanism exhibiting flexibility properties such that the folding furniture piece assumes an unfolded state in which both the vertebral column and spring mechanism are substantially straight to provide a closed sitting surface and, in response to an externally applied bending force, assumes an adjustably folded state in which both the vertebral column and spring mechanism are curved to expose the sitting surface on which an object can rest, and wherein, in response to the externally applied bending force, at least a portion of the spring mechanism travels along the external surface of the object base such that the locking mechanism operatively interlocks with one of the slots in the plurality of slots and causes the folding furniture piece to remain releasably locked in the adjustably folded state.

9. The folding furniture piece of claim 8, wherein the folding furniture piece is mounted onto the back panel of a vehicle seat.

10. The folding furniture piece of claim 8, wherein the multiple vertebral members of the articulated vertebral column are interconnected via living hinges and each vertebral member comprises chamfered sides, and wherein, in response to the externally applied bending force, the living hinges bend such that the chamfered sides of the multiple vertebral members press against each other or one end of the object base such that the vertebral column will bend and cause the folding furniture piece to assume the folded state.

11. The folding furniture piece of claim 10, wherein the chamfered sides are at a five degree angle.

12. The folding furniture piece of claim 8, wherein:
the locking mechanism is mounted to the external surface of the object base via a spring hinge;
the locking mechanism further comprises a stop;
each slot in the plurality of slots comprises a tapered side and a flat side; and
wherein the stop is configured to pass over each slot via the tapered side until the stop can return to rest in a selected slot of the plurality slots while at least a portion of the spring mechanism travels along the external surface of the object base, the stop is further configured to return to rest in the selected slot so as to allow the locking mechanism to operatively interlock with the selected slot when the stop presses against the flat side of the selected slot.

13. The folding furniture piece of claim 12, wherein the locking mechanism further comprises a handle configured to enable a user to move the stop away from resting against the surface of the spring mechanism or within a selected slot via the spring hinge.

14. The folding furniture piece of claim 8, wherein both the one or more connecting members and spring mechanism are flexible steel strips.

15. A method of installing a folding furniture piece onto a surface, the method comprising:
providing a folding furniture piece configured for convenient storage, the folding furniture piece comprising:
a spring mechanism comprising a flange;
an articulated vertebral column comprising multiple vertebral members arranged in lengthwise parallel alignment with one another and operatively connected to one another via one or more connecting members;
the one or more connecting members configured to cooperate with the operatively connected vertebral members to form a flexible unit comprising the vertebral column and an object base;
the object base having opposite ends between which is located a sitting surface on one side and an external surface on the opposite side, one end of the object base connected to the vertebral column and the other end of the object base constituting a free end;
a locking mechanism located on the external surface of the object base; and
the spring mechanism exhibiting flexibility properties such that the folding furniture piece assumes an unfolded state in which both the vertebral column and spring mechanism are substantially straight to provide a closed sitting surface and, in response to an externally applied bending force, assumes a folded state in which both the vertebral column and spring mechanism are curved to expose the sitting surface on which an object can rest, and wherein, in response to the externally applied bending force, at least a portion of the spring mechanism travels along the external surface of the object base such that the locking mechanism operatively interlocks with the flange and causes the folding furniture piece to remain releasably locked in the folded state;
fastening a section of the folding furniture piece located below the articulated vertebral column onto the surface;
allowing space for an external bending force to be applied to at least the spring mechanism; and
allowing space for the folding furniture piece to assume a folded state in which both the vertebral column and spring mechanism are curved to expose the sitting surface on which an object can rest.

16. The method of installing a folding furniture piece of claim 15, wherein the surface is the back panel of a vehicle seat.

17. The method of installing a folding furniture piece of claim 15, wherein the multiple vertebral members of the articulated vertebral column are interconnected via living hinges and each vertebral member comprises chamfered sides, and wherein, in response to the externally applied bending force, the living hinges bend such that the chamfered sides of the multiple vertebral members press against each other or one end of the object base such that the vertebral column will bend and cause the folding furniture piece to assume the folded state.

18. The method of installing a folding furniture piece of claim 17, wherein the chamfered sides are at a five degree angle.

19. The method of installing a folding furniture piece of claim 15, wherein:
the locking mechanism is mounted to the external surface of the object base via a spring hinge;
the locking mechanism further comprises a stop; and
wherein the stop is configured to pass over the flange while at least a portion of the spring mechanism travels along the external surface of the object base, the stop is further configured to return to rest against the spring mechanism after passing over the flange so as to allow the locking mechanism to operatively interlock with the flange when the stop presses against one side of the flange.

20. The method of installing a folding furniture piece of claim 19, wherein the locking mechanism further comprises a handle configured to enable a user to move the stop away from resting against the surface of the spring mechanism via the spring hinge.

\* \* \* \* \*